(12) United States Patent
Sala (10) Patent No.: US 10,252,772 B2
(45) Date of Patent: Apr. 9, 2019

(54) ELECTRONIC SHIFTING DEVICE AND BICYCLE USING THE SAME

(71) Applicant: TH INDUSTRIES CO., LTD., Taichung (TW)

(72) Inventor: Alfredo Sala, Taichung (TW)

(73) Assignee: TH INDUSTRIES CO., LTD., Taichung (TW)

( * ) Notice: Subject to any disclaimer, the term of this patent is extended or adjusted under 35 U.S.C. 154(b) by 388 days.

(21) Appl. No.: 15/339,946

(22) Filed: Nov. 1, 2016

(65) Prior Publication Data

US 2018/0043968 A1 Feb. 15, 2018

(30) Foreign Application Priority Data

Aug. 10, 2016 (TW) .............................. 105125429 A (51) Int. Cl.
| | |
|---|---|
| *B62M 1/36* | (2013.01) |
| *B62K 23/06* | (2006.01) |
| *B62M 25/00* | (2006.01) |
| *B62M 25/08* | (2006.01) |
| *B62M 9/122* | (2010.01) |

(52) U.S. Cl.
CPC ............. *B62M 9/122* (2013.01); *B62K 23/06* (2013.01); *B62M 1/36* (2013.01); *B62M 25/08* (2013.01); *B62M 2025/006* (2013.01)

(58) Field of Classification Search
CPC ...... B62M 25/08; B62M 9/122; B62M 9/132; B62M 25/045; Y10T 74/20037
USPC ........................................................... 474/80
See application file for complete search history.

(56) References Cited

U.S. PATENT DOCUMENTS

| | | | | |
|---|---|---|---|---|
| 4,412,828 A | * | 11/1983 | Darby ...................... | B62M 9/12 474/78 |
| 4,490,127 A | * | 12/1984 | Matsumoto ............ | B62M 9/122 280/236 |
| 5,059,158 A | * | 10/1991 | Bellio ...................... | B62M 9/12 474/103 |
| 5,213,548 A | * | 5/1993 | Colbert .................. | B62M 25/08 280/238 |
| 5,254,044 A | * | 10/1993 | Anderson .............. | B62M 9/122 474/103 |
| 5,357,177 A | * | 10/1994 | Fey ......................... | B62M 25/08 318/3 |
| 5,577,969 A | * | 11/1996 | Watarai .................. | B62M 9/122 474/78 |

(Continued)

*Primary Examiner* — Henry Y Liu (57) ABSTRACT

An electronic shifting device and a bicycle using the same are provided. The electronic shifting device includes a primary controller, a first electronic derailleur unit, a second electronic derailleur unit, a cable, a main power supply and a first control unit. The first electronic derailleur unit is disposed adjacent to a first sprocket set, and the second electronic derailleur unit is disposed adjacent to a second sprocket set. The first electronic derailleur unit and the second electronic derailleur unit are configured to move a chain between a plurality of sprockets. The cable electrically connects the primary controller, the first electronic derailleur unit and the second electronic derailleur unit. The main power supply provides electrical power to the primary controller, the first electronic derailleur unit and the second electronic derailleur unit by the cable. The first control unit is configured for wirelessly transmitting a first control signal to the primary controller.

13 Claims, 5 Drawing Sheets

(56) References Cited

U.S. PATENT DOCUMENTS

| | | | |
|---|---|---|---|
| 6,623,389 B1* | 9/2003 | Campagnolo | B62M 9/122 474/70 |
| 6,726,586 B2* | 4/2004 | Fukuda | B62M 9/122 474/70 |
| 6,857,975 B2* | 2/2005 | Kitamura | B62M 9/122 180/171 |
| 6,945,888 B2* | 9/2005 | Fukuda | B62J 99/00 474/70 |
| 7,159,881 B2* | 1/2007 | Guderzo | B62M 9/122 280/259 |
| 7,207,912 B2* | 4/2007 | Takeda | B62M 25/045 280/260 |
| 7,285,064 B2* | 10/2007 | Ichida | B62M 9/131 474/80 |
| 7,288,038 B2* | 10/2007 | Takeda | B62M 9/122 474/80 |
| 7,306,531 B2* | 12/2007 | Ichida | B62M 9/122 474/70 |
| 7,373,232 B2* | 5/2008 | Guderzo | B62M 9/122 474/116 |
| 7,547,263 B2* | 6/2009 | Fukuda | B62M 25/08 280/260 |
| 7,553,247 B2* | 6/2009 | Guderzo | B62J 99/00 280/260 |
| 7,798,929 B2* | 9/2010 | Takamoto | B62M 25/08 474/80 |
| 8,025,597 B2* | 9/2011 | Takamoto | B62M 25/08 474/70 |
| 8,202,182 B2* | 6/2012 | Ishikawa | B62M 9/1248 192/226 |
| 8,241,158 B2* | 8/2012 | Ishikawa | B62M 25/08 474/80 |
| 8,550,942 B2* | 10/2013 | Oda | B62K 23/06 474/80 |
| 8,721,495 B2* | 5/2014 | Kitamura | B62J 6/06 477/7 |
| 8,900,078 B2* | 12/2014 | Yamaguchi | B62M 9/1244 474/80 |
| 9,008,923 B2* | 4/2015 | Takamoto | B62M 25/00 474/116 |
| 9,037,368 B2* | 5/2015 | Miglioranza | F16H 9/04 701/60 |
| 2006/0189423 A1* | 8/2006 | Ichida | B62M 9/131 474/80 |
| 2008/0087126 A1* | 4/2008 | Oda | B62K 23/06 74/473.13 |

* cited by examiner

ELECTRONIC SHIFTING DEVICE AND BICYCLE USING THE SAME

FIELD OF THE INVENTION

The present invention relates to an electronic shifting device and a bicycle using the same, and more particularly to a multi-speed bicycle and an electronic shifting device thereof; a control unit of the electronic shifting device can wirelessly transmit control signals to a front derailleur unit and a rear derailleur unit that are electrically connected via a cable.

BACKGROUND OF THE INVENTION

A conventional bicycle having electronic shifting device as disclosed in U.S. Pat. No. 7,798,929 utilizes a signal cable to connect an input element to a front derailleur unit and a rear derailleur unit. It also utilizes a power cable to connect a power supply to the input element, the front derailleur unit and the rear derailleur unit. The conventional bicycle has a complicated wiring structure, and the cables may increase total weight of the bicycle.

Another conventional bicycle having electronic shifting device is disclosed in U.S. Pat. No. 7,760,078. An input element transmits control signals to a front derailleur unit and a rear derailleur unit wirelessly, and each of the front derailleur unit and the rear derailleur unit has a battery serving as a power supply. Although the electronic shifting device of such conventional bicycle is operated wirelessly and has no complicated wiring structure, several batteries are needed, and radio frequency interference tends to occur when several electronic shifting devices are used in the same environment.

SUMMARY OF THE INVENTION

The present disclosure provides an electronic shifting device for bicycles. The electronic shifting device of the present disclosure utilizes a cable to electrically connect a primary controller, a first electronic derailleur unit and a second electronic derailleur unit, while the primary controller is connected to a first control unit and a second control unit wirelessly. Since the primary controller, the first electronic derailleur unit and the second electronic derailleur unit are electrically connected by the cable, a main power unit can provide power to the primary controller, the first electronic derailleur unit and the second electronic derailleur unit via the cable. The wireless connection of the primary controller and the first control unit and the second control unit eliminates complicated wiring structure and thus reduces the total weight of the bicycle. Therefore, the electronic shifting device of the present disclosure combines the advantages and eliminates the drawbacks of wired and wireless controls.

The present disclosure discloses an electronic shifting device for a bicycle including a frame, a first sprocket unit mounted onto the frame, a second sprocket unit mounted onto the frame and an endless chain joining the first sprocket unit and the second sprocket unit, and an embodiment of the electronic shifting device. The electronic shifting device includes a first electronic derailleur unit, a second electronic derailleur unit, a primary controller, a cable, a main power unit and a first control unit. The first electronic derailleur unit is disposed on the frame and adjacent to the first sprocket unit, and is configured to move the endless chain to different positions on the first sprocket unit. The second electronic derailleur unit is disposed on the frame and adjacent to the second sprocket unit, and is configured to move the endless chain to different positions on the second sprocket unit. The primary controller is configured to control the first electronic derailleur unit and the second electronic derailleur unit. The cable electrically connects the primary controller, the first electronic derailleur unit and the second electronic derailleur unit. The main power unit is electrically connected to the primary controller, the first electronic derailleur unit and the second electronic derailleur unit by the cable and is configured to provide electrical power to the primary controller, the first electronic derailleur unit and the second electronic derailleur unit. The first control unit is configured to transmit a first control signal to the primary controller wirelessly.

In one embodiment, the first control unit includes a first power supply, a first input element, a first wireless transceiver and a first antenna. The first control signal is generated by triggering the first input element and is transmitted to the primary controller via the first antenna by the first wireless transceiver.

In one embodiment, the electronic shifting device further includes a second control unit for transmitting a second control signal to the primary controller wirelessly. The second control unit includes a second power supply, a second input element, a second wireless transceiver and a second antenna. The second control signal is generated by triggering the second input element and is transmitted to the primary controller via the second antenna by the second wireless transceiver.

In one embodiment, the primary controller is disposed in the first electronic derailleur unit. The first electronic derailleur unit further includes a first driver, a third wireless transceiver and a third antenna. The second electronic derailleur unit includes a secondary controller and a second driver. The third wireless transceiver receives the first control signal via the third antenna and transmits the first control signal to the primary controller. The primary controller controls the first driver to move the first electronic derailleur unit or controls the secondary controller to drive the second driver to move the second electronic derailleur unit.

In one embodiment, the primary controller is disposed in the second electronic derailleur unit. The first electronic derailleur unit further includes a secondary controller and a first driver. The second electronic derailleur unit includes a second driver, a third wireless transceiver and a third antenna. The third wireless transceiver receives the first control signal via the third antenna and transmits the first control signal to the primary controller. The primary controller controls the second driver to move the second electronic derailleur unit or controls the secondary controller to drive the first driver to move the first electronic derailleur unit.

In one embodiment, the first electronic derailleur unit further includes a first sensor configured to detect physical parameters of the first driver, and the second electronic derailleur unit further includes a second sensor configured to detect physical parameters of the second driver.

In one embodiment, the first driver includes a first motor, the second driver includes a second motor, the first sensor includes a first encoder configured to convert the physical parameters of the first driver into first digital data, and the second sensor includes a second encoder configured to convert the physical parameters of the second driver into second digital data.

In one embodiment, the first electronic derailleur unit further includes a memory unit configured to store the first and second digital data converted by the first encoder and the second encoder.

Since the present disclosure omits the wiring connecting the first control unit and the second control unit to the first electronic derailleur unit and the second electronic derailleur unit, consideration of wiring configuration is no longer required in designing the bicycle, and wind drag and weight distribution issues are also prevented. The wired connection between the first electronic derailleur unit and the second electronic derailleur unit increases control accuracy and prevents signal distortion and radio frequency interference occurred during wireless communication.

The present disclosure also discloses a bicycle using the electronic shifting device. The bicycle includes a frame, a crank set rotatably mounted onto the frame, a first sprocket unit mounted onto the frame and rotated by the crank set, a second sprocket unit mounted onto the frame, an endless chain joining the first sprocket unit and the second sprocket unit and the aforementioned electronic shifting device.

In one embodiment, the bicycle further includes a handle bar and a pair of brake levers disposed on the handle bar. The first control unit and the second control unit are disposed on the brake levers respectively.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of the present disclosure are presented herein for purpose of illustration and description only. It is not intended to be exhaustive or to be limited to the precise form disclosed.

Figure 1:
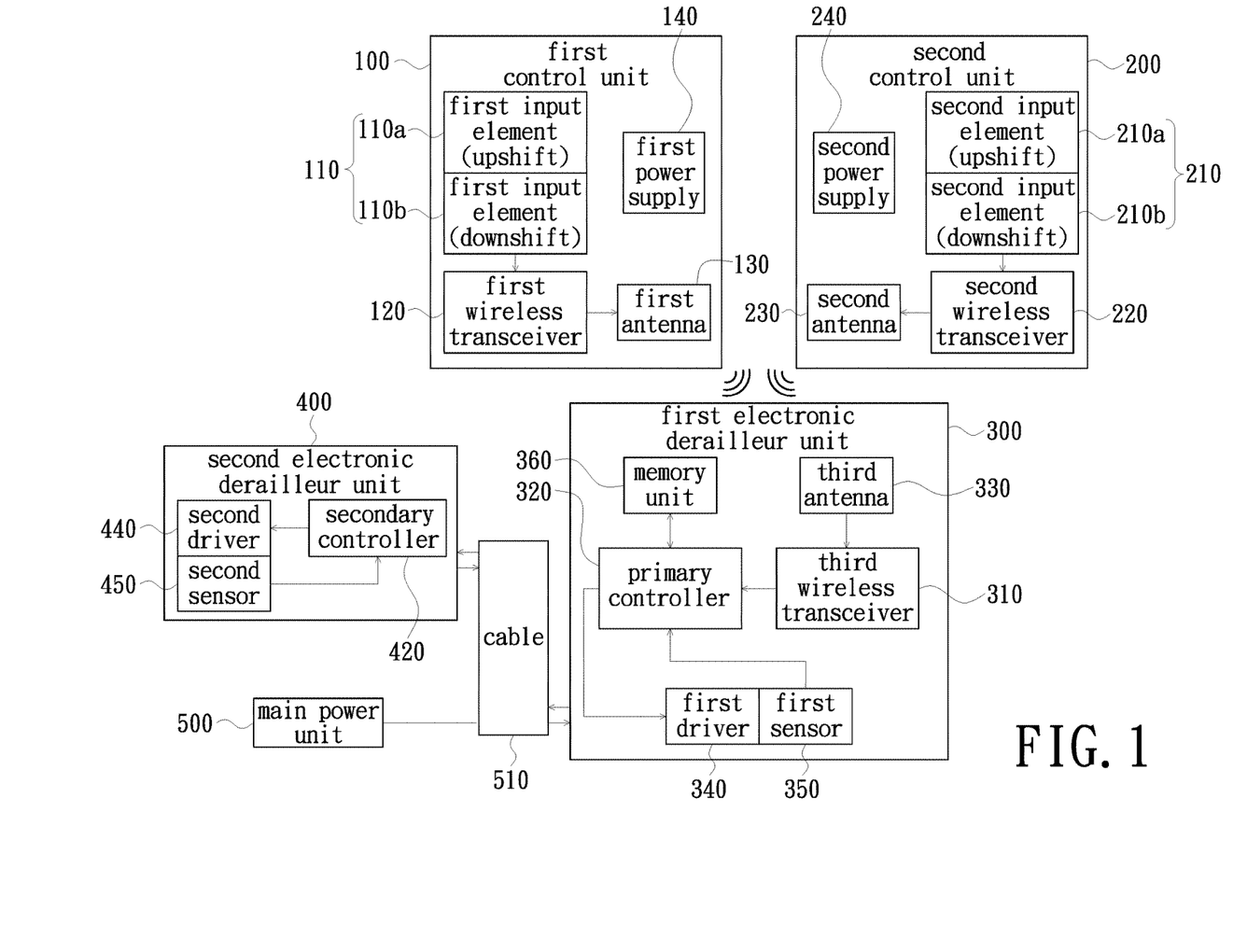
FIG. 1 is a block diagram of a first embodiment of an electronic shifting device of the present disclosure.
Figure 2:
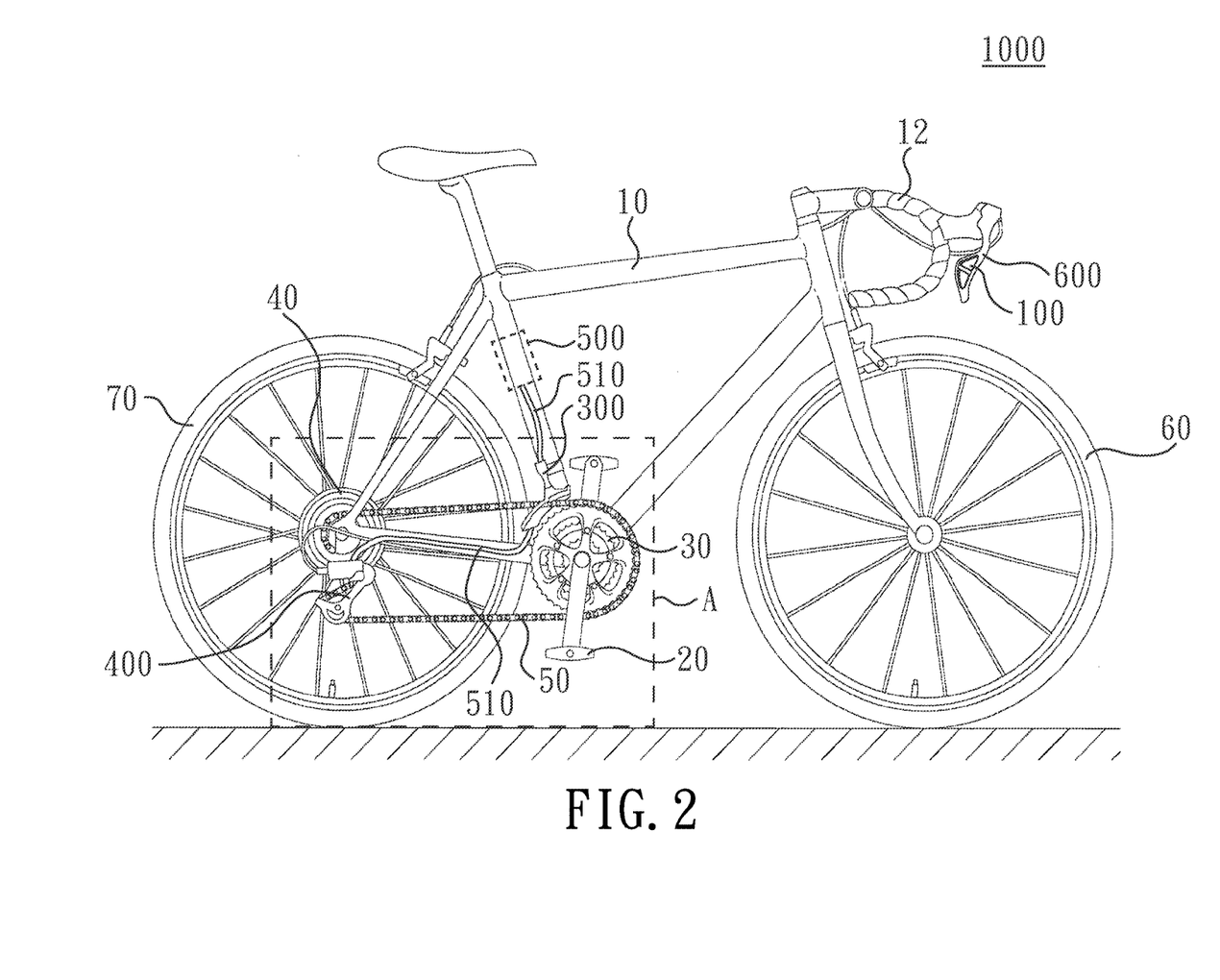
FIG. 2 is a schematic view of an embodiment of a bicycle using the electronic shifting device of FIG. 1.
Figure 3:
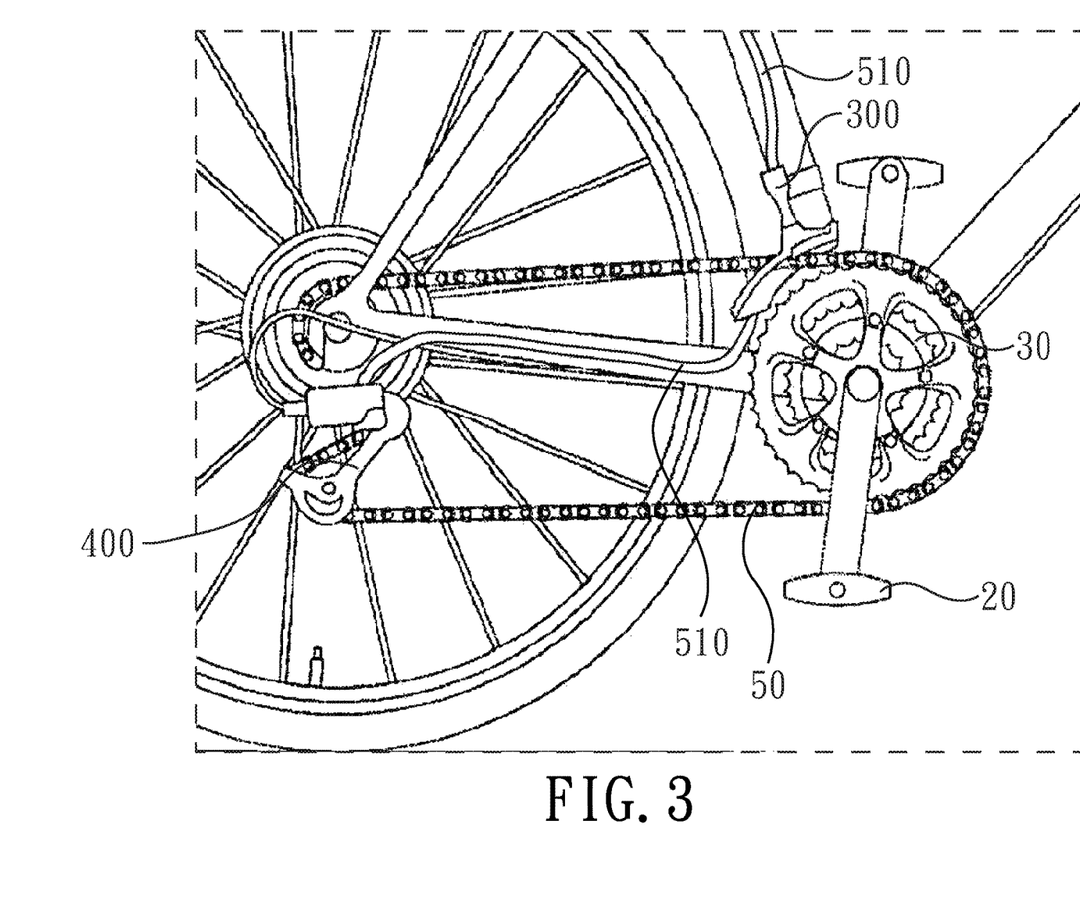
FIG. 3 is an enlarged view of portion A in FIG. 2.

Referring to FIGS. 1 and 2. The first embodiment of the electronic shifting device of the present disclosure includes a first control unit 100, a second control unit 200, a first electronic derailleur unit 300, a second electronic derailleur unit 400, a primary controller 320, a cable 510 and a main power unit 500. The first control unit 100 and the second control unit 200 are connected to the primary controller 320 wirelessly. The primary controller 320, the first electronic derailleur unit 300 and the second electronic derailleur unit 400 are electrically connected by the cable 510 as shown in FIG. 3. The main power unit 500 is also electrically connected to the primary controller 320, the first electronic derailleur unit 300 and the second electronic derailleur unit 400 via the cable 510 and provides electrical power to the primary controller 320, the first electronic derailleur unit 300 and the second electronic derailleur unit 400. In this embodiment, the main power unit 500 is a battery.

In the first embodiment, the electronic shifting device of the disclosure can be mounted onto a bicycle 1000. The bicycle 1000 includes a frame 10, a crankset 20, a first sprocket unit 30, a second sprocket unit 40 and an endless chain 50. The first sprocket unit 30 and the second sprocket unit 40 are mounted onto the frame 10. The first sprocket unit 30 is driven by the crankset 20, and the second sprocket unit 40 is disposed to drive a rear wheel 70 of the bicycle 1000. When a user pedals the crankset 20, the first sprocket unit 30 rotates. The rotation of the first sprocket unit 30 is transmitted to the second sprocket 40 through the endless chain 50 so as to rotate the rear wheel 70 and thus move the bicycle 1000 forwards. In this embodiment, the first sprocket unit 30 includes a plurality of sprockets of different diameters, and the sprockets are arranged according to their diameters, for example, from small diameter to large diameter or from large diameter to small diameter. The second sprocket unit 40 includes a plurality of sprockets of different diameters, and the sprockets are also arranged according to their diameters, for example, from small diameter to large diameter or from large diameter to small diameter. The endless chain 50 connects one of the sprockets of the first sprocket unit 30 and one of the sprockets of the second sprockets 40. The electronic shifting device of the disclosure is configured to move the endless chain 50 between different sprockets of the first sprocket unit 30 and the second sprocket unit 40 so as to upshift or downshift the bicycle. The bicycle 1000 further includes a handle bar 12 and two brake levers 600. The handle bar 12 is associated with the front wheel 60 to control the travel direction of the bicycle 1000. The brake levers 600 are mounted to the handle bar 12 and may be pressed to decelerate or stop the bicycle 1000.

Figure 5:
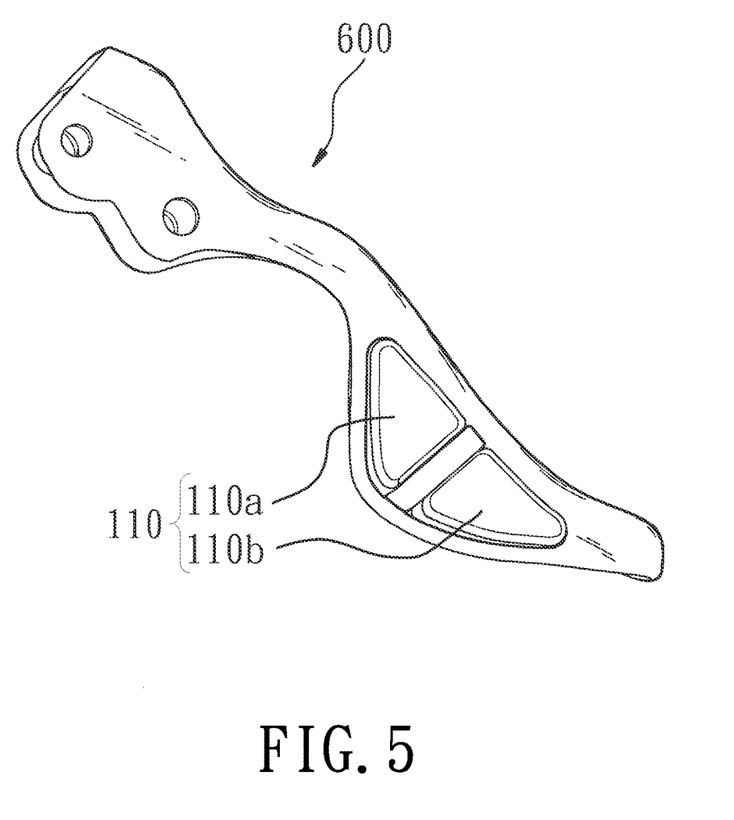
FIG. 5 depicts a first control unit or a second control unit of the present disclosure mounted onto a brake lever.

In the first embodiment, the primary controller 320 is disposed in the first electronic derailleur unit 300, which is mounted onto the frame 10 and adjacent to the first sprocket unit 30. The second electronic derailleur unit 400 is mounted onto the frame 10 and adjacent to the second sprocket unit 40. The primary controller 320, the first electronic derailleur unit 300 and the second electronic derailleur unit 400 are electrically connected by the cable 510, and the primary controller 320 controls the first electronic derailleur unit 300 and the second electronic derailleur unit 400 to move the endless chain 50. The main power unit 500 is electrically connected to the primary controller 320, the first electronic derailleur unit 300 and the second electronic derailleur unit 400 via the cable 510, and provides electrical power to the primary controller 320, the first electronic derailleur unit 300 and the second electronic derailleur unit 400. The first control unit 100 and the second control unit 200 are disposed in the two brake levers 600. FIG. 5 shows the first control unit 100 mounted in the brake lever 600. The first control unit 100 and the second control unit 200 are triggered by a user to generate a first control signal and a second control signal. The first control unit 100 and the second control unit 200 transmit the first control signal and the second control signal wirelessly to the main controller 320 respectively to control the first electronic derailleur unit 300 and the second electronic derailleur unit 400, so that the endless chain 50 is moved by the first electronic derailleur unit 300 and the second electronic derailleur unit 400 and is thus connected to different sprockets of the first sprocket unit 30 and the second sprocket unit 40.

Referring to FIG. 1, the first control unit 100 includes a first input element 110, a first wireless transceiver 120 and a first antenna 130. The first input element 110 includes a first input element (for upshifting) 110a and a first input element (for downshifting) 110b. FIG. 5 shows the first input element 110a, 110b mounted on an outer surface the brake lever 600. The first control unit 100 further includes a first power supply 140 for providing electrical power to the first control unit 100. The second control unit 200 includes a second input element 210, a second wireless transceiver 220 and a second antenna 230. The second input element 210 includes a second input element (for upshifting) 210a and a second input element (for downshifting) 210b. The second control unit 200 further includes a second power supply 240 for providing electrical power to the second control unit 200.

The first electronic derailleur unit 300 includes a first driver 340, a third wireless transceiver 310 and a third antenna 330. The second electronic derailleur unit 400 includes a secondary controller 420 and a second driver 440. The first electronic derailleur unit 300 further includes a first sensor 350 configured to detect physical parameters of the first driver 340. In this embodiment, the first driver 340 and the second driver 440 are motors. The first sensor 350 is configured to detect the number of revolution of the first driver 340. The second electronic derailleur unit 400 further includes a second sensor 450 configured to detect physical parameters of the second driver 440. In this embodiment, the second sensor 450 is configured to detect the number of revolution of the second driver 440. In this embodiment, the first sensor 350 includes a first encoder, and the second sensor 450 includes a second encoder. The first encoder converts the physical parameters of the first driver 340 into first digital data, and the second encoder converts the physical parameters of the second driver 440 into second digital data. In this embodiment, the first encoder converts the number of revolution of the first driver 340 into the first digital data, and the second encoder converts the number of revolution of the second driver 440 into the second digital data. In this embodiment, the first electronic derailleur unit 300 further includes a memory unit 360 configured to store the first and second digital data converted by the first encoder and the second encoder.

In this embodiment, the first control signal is generated when a user triggers the first input element 110a or the first input element 110b, and the second control signal is generated when a user triggers the second input element 210a or the second input element 210b. The first control signal is transmitted by the first wireless transceiver 120 and the first antenna 130 and is received by the third wireless transceiver 310 via the third antenna 330. The second control signal is transmitted by the second wireless transceiver 220 and the second antenna 230 and is received by the third wireless transceiver 310 via the third antenna 330. The received first control signal and the received second control signal are transmitted to the primary controller 320 from the wireless transceiver 310. The primary controller 320 controls the first driver 340 to drive the first electronic derailleur unit 300 according to the first control signal so as to move the endless chain 50. The primary controller 320 transmits the second control signal to the secondary controller 420 of the second electronic derailleur unit 400 via the cable 510, and the secondary controller 420 controls the second driver 440 to drive the second electronic derailleur unit 400 according to the second control signal so as to move the endless chain 50.

Figure 4:
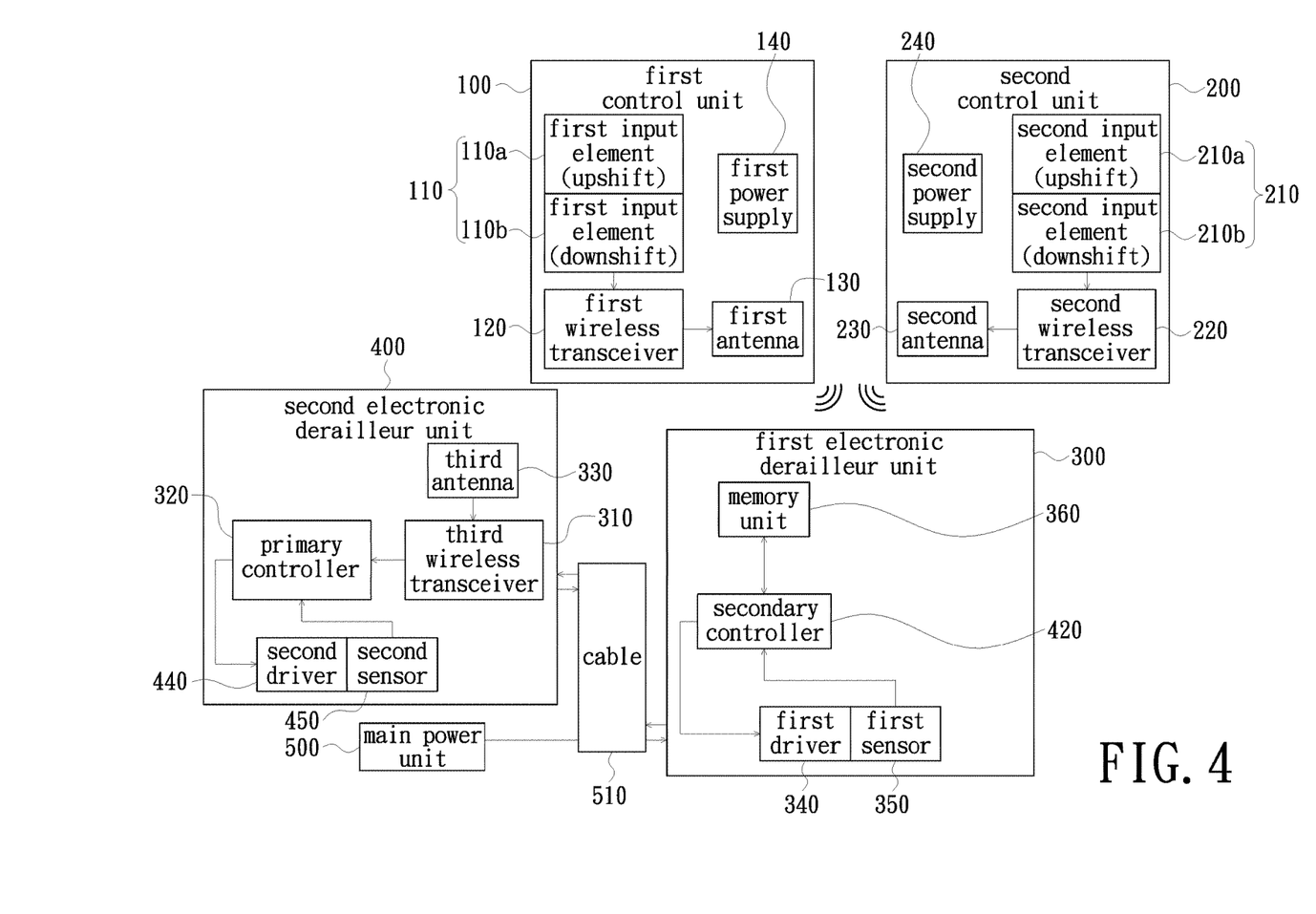
FIG. 4 is a block diagram of a second embodiment of an electronic shifting device of the present disclosure.

Although the third wireless transceiver 310, the primary controller 320 and the third antenna 330 are disposed in the first electronic derailleur unit 300, and the secondary controller 420 is disposed in the second electronic derailleur unit 400 in the first embodiment, the present disclosure is not limited thereto. As shown in FIG. 4, in the second embodiment of the electronic shifting device of the present disclosure, the third wireless transceiver 310, the primary controller 320 and the third antenna 330 are disposed in the second electronic derailleur unit 400, and the secondary controller 420 is disposed in the first electronic derailleur unit 300. The first control signal from the first control unit 100 and the second control signal from the second control unit 200 are transmitted to the primary controller 320 disposed in the second electronic derailleur unit 400. The primary controller 320 of the second electronic derailleur unit 400 controls the secondary controller 420 of the first electronic derailleur unit 300 to drive the first drive 340 so as to drive the first electronic derailleur unit 300.

Since the electronic shifting device of the present disclosure utilizes wireless connection to connect the first control unit and the second control unit to the first electronic derailleur unit and the second electronic derailleur unit, consideration of wiring configuration therebetween is no longer required in designing the bicycle, and wind drag and weight distribution issues are also prevented. The wired connection between the first electronic derailleur unit and the second electronic derailleur unit enhances control accuracy and prevents signal distortion and radio frequency interference occurred during wireless communication.

In addition, as the first control unit and the second control unit are disposed in the brake levers, more spaces would become available for installation of larger antennas or other applications.

While the present disclosure has been described in terms of what is presently considered to be the most practical and preferred embodiments, it is to be understood that the present disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electronic shifting device for a bicycle comprising a frame, a first sprocket unit mounted onto the frame, a second sprocket unit mounted onto the frame and an endless chain joining the first sprocket unit and the second sprocket unit, the electronic shifting device comprising:

a first electronic derailleur unit disposed on the frame and adjacent to the first sprocket unit for moving the endless chain to a plurality of positions on the first sprocket unit;

a second electronic derailleur unit disposed on the frame and adjacent to the second sprocket unit for moving the endless chain to a plurality of positions on the second sprocket unit;

a primary controller for controlling the first electronic derailleur unit and the second electronic derailleur unit; and a cable electrically connecting the primary controller, the first electronic derailleur unit and the second electronic derailleur unit;

a main power unit electrically connected to the primary controller, the first electronic derailleur unit and the second electronic derailleur unit by the cable for providing electrical power to the primary controller, the first electronic derailleur unit and the second electronic derailleur unit; and a first control unit for transmitting a first control signal to the primary controller wirelessly.

2. The electronic shifting device as claimed in claim 1, wherein the first control unit comprises a first power supply, a first input element, a first wireless transceiver and a first antenna, and the first control signal is generated by triggering the first input element and is transmitted to the primary controller via the first antenna by the first wireless transceiver.

3. The electronic shifting device as claimed in claim 1, further comprising a second control unit for transmitting a second control signal to the primary controller wirelessly and comprising a second power supply, a second input element, a second wireless transceiver and a second antenna, and a second control signal is generated by triggering the second input element and is transmitted to the primary controller via the second antenna by the second wireless transceiver.

4. The electronic shifting device as claimed in claim 1, wherein the primary controller is disposed in the first electronic derailleur unit, the first electronic derailleur unit further comprises a first driver, a third wireless transceiver and a third antenna, the second electronic derailleur unit comprises a secondary controller and a second driver, the third wireless transceiver receives the first control signal via the third antenna and transmits the first control signal to the primary controller, and the primary controller controls the first driver to move the first electronic derailleur unit or controls the secondary controller to drive the second driver to move the second electronic derailleur unit.

5. The electronic shifting device as claimed in claim 4, wherein the first electronic derailleur unit further comprises a first sensor for detecting physical parameters of the first driver, and the second electronic derailleur unit further comprises a second sensor for detecting physical parameters of the second driver.

6. The electronic shifting device as claimed in claim 5, wherein the first driver comprises a first motor, the second driver comprises a second motor, the first sensor comprises a first encoder for converting the physical parameters of the first driver into first digital data, and the second sensor comprises a second encoder for converting the physical parameters of the second driver into second digital data.

7. The electronic shifting device as claimed in claim 6, wherein the first electronic derailleur unit further comprises a memory unit for storing the first digital data converted by the first encoder and the second digital data converted by the second encoder.

8. The electronic shifting device as claimed in claim 1, wherein the primary controller is disposed in the second electronic derailleur unit, the first electronic derailleur unit further comprises a secondary controller and a first driver, the second electronic derailleur unit comprises a second driver, a third wireless transceiver and a third antenna, the third wireless transceiver receives the first control signal via the third antenna and transmits the first control signal to the primary controller, and the primary controller controls the second driver to move the second electronic derailleur unit or controls the secondary controller to drive the first driver to move the first electronic derailleur unit.

9. The electronic shifting device as claimed in claim 8, wherein the first electronic derailleur unit further comprises a first sensor for detecting physical parameters of the first driver, and the second electronic derailleur unit further comprises a second sensor for detecting physical parameters of the second driver.

10. The electronic shifting device as claimed in claim 9, wherein the first driver comprises a first motor, the second driver comprises a second motor, the first sensor comprises a first encoder for converting the physical parameters of the first driver into first digital data, and the second sensor comprises a second encoder for converting the physical parameters of the second driver into second digital data.

11. The electronic shifting device as claimed in claim 10, wherein the first electronic derailleur unit further comprises a memory unit for storing the first digital data converted by the first encoder and the second digital data converted by the second encoder.

12. A bicycle, comprising:
a frame;
a crank set rotatably mounted onto the frame;
a first sprocket unit mounted onto the frame and rotated by the crank set;
a second sprocket unit mounted onto the frame;
a chain joining the first sprocket unit and the second sprocket unit; and
an electronic shifting device as claimed in claim 1.

13. The bicycle as claimed in claim 12, further comprising a handle bar and a pair of brake levers disposed on the handle bar, wherein the first control unit and the second control unit are disposed on the brake levers respectively.

* * * * *